(12) United States Patent  
Akahori

(10) Patent No.: US 11,675,652 B2  
(45) Date of Patent: Jun. 13, 2023

(54) SEMICONDUCTOR DEVICE

(71) Applicant: LAPIS Semiconductor Co., Ltd., Yokohama (JP)

(72) Inventor: Hiroji Akahori, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 117 days.

(21) Appl. No.: 17/216,640

(22) Filed: Mar. 29, 2021

(65) Prior Publication Data

US 2021/0303390 A1  Sep. 30, 2021

(30) Foreign Application Priority Data

Mar. 31, 2020 (JP) .............................. JP2020-065274

(51) Int. Cl.
*G06F 11/07* (2006.01)
*G06F 11/30* (2006.01)

(52) U.S. Cl.
CPC ...... *G06F 11/0793* (2013.01); *G06F 11/0757* (2013.01); *G06F 11/3024* (2013.01); *G06F 11/3041* (2013.01); *G06F 11/3089* (2013.01)

(58) Field of Classification Search
None
See application file for complete search history.

(56) References Cited

FOREIGN PATENT DOCUMENTS

| CN | 105871873 A | * | 8/2016 | ......... H04L 63/0442 |
| JP | 2010250581 | | 11/2010 | |
| JP | 2013074348 A | * | 4/2013 | ......... H04L 63/0442 |

* cited by examiner

*Primary Examiner* — Guerrier Merant
(74) *Attorney, Agent, or Firm* — JCIPRNET

(57) ABSTRACT

To provide a semiconductor device having a monitoring function with a higher degree of freedom. The semiconductor device includes: a function part that executes a predetermined process triggered according to an activation signal sent from an external device and outputs a completion signal after the predetermined process is completed; a first clocking part that monitors a first abnormality in the predetermined process based on the activation signal and the completion signal; and a branch part pair including a first branch part and a second branch part, wherein the first branch part branches the activation signal and then sends the branched activation signal to the function part and the first clocking part, and the second branch part branches the completion signal and then sends the branched completion signal to the first clocking part and the external device.

19 Claims, 7 Drawing Sheets

SEMICONDUCTOR DEVICE

CROSS-REFERENCE TO RELATED APPLICATION

This application claims the priority benefit of Japan application serial no. 2020-065274, filed on Mar. 31, 2020. The entirety of each of the above-mentioned patent applications is hereby incorporated by reference herein and made a part of this specification.

BACKGROUND

Technical Field

The disclosure relates to a semiconductor device.

Related Art

A semiconductor device may have a monitoring function as needed. In addition, as one of the methods for realizing the monitoring function, a method using a timer is known. As the semiconductor device having the monitoring function using the timer, for example, a semiconductor device disclosed in Japanese Patent Application Laid-Open No. 2010-250581 is known. The semiconductor device disclosed in Japanese Patent Application Laid-Open No. 2010-250581 includes an abnormality detection block configured by a detection circuit, a detection signal setting circuit, a determination circuit, and the timer. In the abnormality detection block according to Japanese Patent Application Laid-Open No. 2010-250581, the detection circuit, in which a signal change to be detected by the detection signal setting circuit is instructed, outputs a pulse when the signal change occurs in a signal obtained from an input/output port. With respect to the timer, a period in which the occurrence of a signal state to be detected as an abnormality is monitored is specified by a setting value of an abnormality detection control register. The determination circuit determines whether or not the signal state to be detected as an abnormality has occurred based on whether or not a detection pulse is generated from the detection circuit before the timer times out. In the semiconductor device according to Japanese Patent Application Laid-Open No. 2010-250581, a dedicated timer is mounted on each of a plurality of abnormality detection blocks.

That is, in the prior art, one other function circuit is connected to a circuit (hereinafter, referred to as "function circuit") that operates based on a predetermined function, and e connection to the end of the other function circuit is also one, but not multiple. Therefore, in a case desired to monitor, for example, an operation time of the function circuit during the operation of the function circuit, the monitoring has been realized by mounting a dedicated monitoring circuit in the function circuit. FIG. 7 shows an example of a semiconductor device 50 having this function according to a comparative example. The semiconductor device 50 is configured to control a series of operations in a plurality of function circuits by a sequence circuit.

As shown in FIG. 7, the semiconductor device 50 includes a connection switching circuit 51, a function circuit 52, and a sequence circuit 53. The function circuit 52 is a circuit that operates based on a predetermined function and includes a timer dedicated for function circuits 55. The sequence circuit 53 is a circuit that controls the execution of the series of operations (hereinafter, referred to as "sequence") in plurality of the function circuits included in the semiconductor device 50, and the sequence circuit 53 generates an activation signal for each function circuit and receives a completion signal from each function circuit. The connection switching circuit 51 includes a selector 54-1 and a selector 54-2. The selector 54-1 distributes the activation signal sent from the sequence circuit 53 to each function circuit, and the selector 54-2 aggregates the completion signal from each function circuit and sends the completion signal to the sequence circuit 53. Moreover, each process included in the sequence is not limited to a case where each process is executed by the plurality of different function circuits 52, and a case where one function circuit 52 executes this function a plurality of times is included.

Here, because the semiconductor device according to Japanese Patent Application Laid-Open No. 2010-250581 described above or the semiconductor device 50 according to the comparative example is equipped with a monitoring circuit for each function circuit, it is necessary to mount the monitoring circuits of the number of the function circuits. However, there is also a case that depending on an application of the semiconductor device, a part of the mounted functions is used instead of all of the mounted functions. When a desired application can be realized using a part of the functions in this way, the monitoring circuit mounted on an unused function circuit is not used and is wasted, which will cause unnecessary restrictions on a circuit arrangement of the semiconductor device 50 and further increase the cost. On the other hand, when the dedicated monitoring circuit is not mounted in advance with an intention of reducing the number of the monitoring circuits, monitoring of a specific function cannot be performed, and thus when a failure or an abnormal operation related to this function occurs, a host system cannot be notified, and function restoration by any avoidance or switching, or the like cannot be performed.

The disclosure provides a semiconductor device having a monitoring function with a higher degree of freedom.

SUMMARY

In order to solve the above problems, a semiconductor device according to the disclosure includes: a function part that executes a predetermined process triggered according to an activation signal sent from an external device and outputs a completion signal after the predetermined process is completed; a first clocking part that monitors a first abnormality in the predetermined process based on the activation signal and the completion signal; and a branch part pair including a first branch part and a second branch part, wherein the first branch part branches the activation signal and then sends the branched activation signal to the function part and the first clocking part, and the second branch part branches the completion signal and then sends the branched completion signal to the first clocking part and the external device.

According to the disclosure, an effect is produced of being able to provide a semiconductor device having a monitoring function with a higher degree of freedom.

DESCRIPTION OF THE EMBODIMENTS

Hereinafter, embodiments of the disclosure are specifically described with reference to the drawings.

First Embodiment

Figure 1:
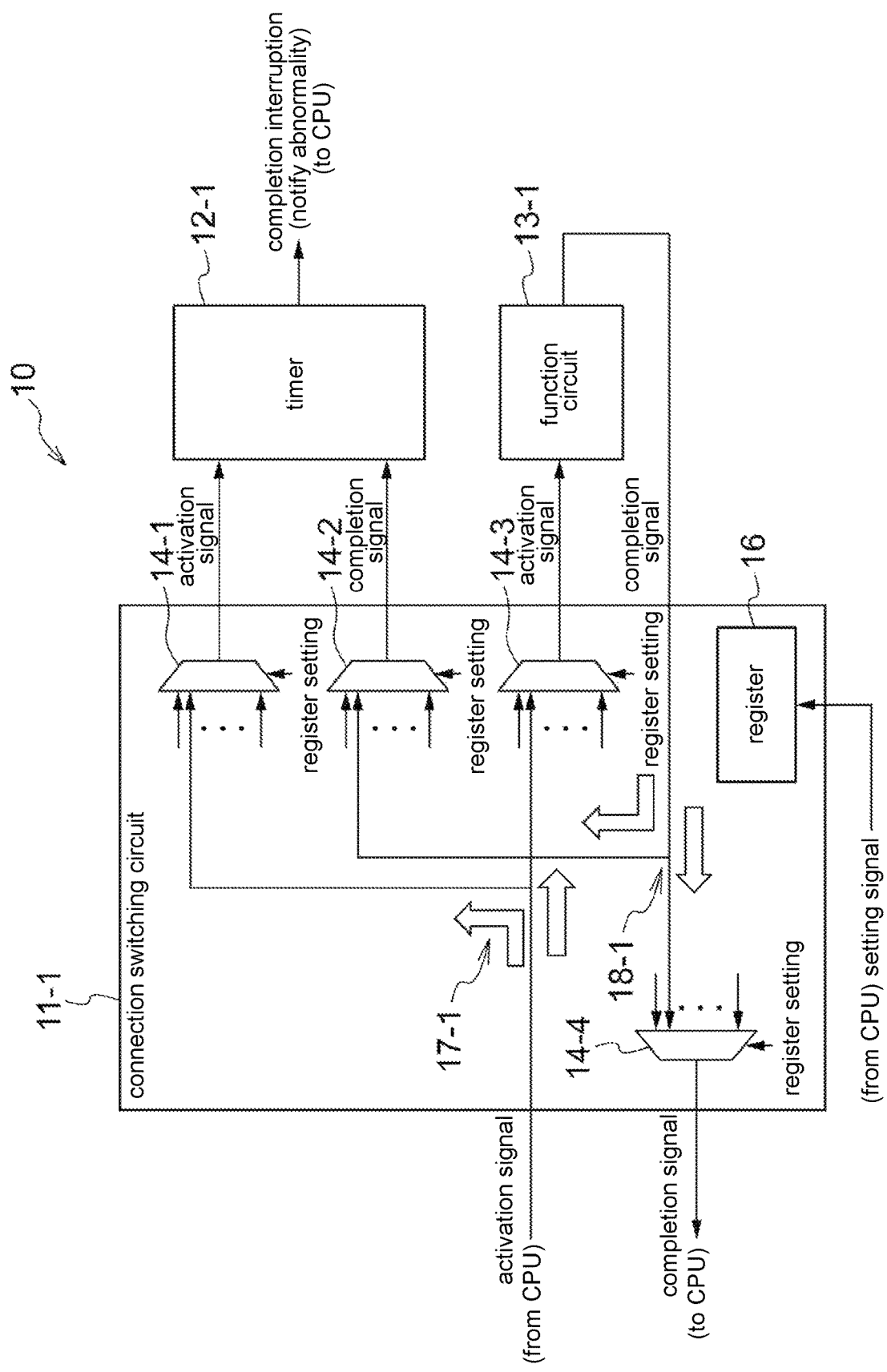
FIG. 1 is a block diagram showing an example of a configuration of a semiconductor device according to a first embodiment.

A semiconductor device according to the embodiment is described with reference to FIG. 1 to FIG. 3. FIG. 1 shows an example of a configuration of a semiconductor device 10 according to the embodiment. As shown in FIG. 1, the semiconductor device 10 includes a function circuit 13-1 (hereinafter, collectively referred to as "the function circuit 13"), a connection switching circuit 11-1, and a timer 12-1 (hereinafter, collectively referred to as "the timer 12").

The function circuit 13-1 is a circuit that operates based on a predetermined function in the semiconductor device 10, and the function circuit 13-1 starts an operation of the function according to an activation signal and outputs a completion signal when the operation is completed. Although one function circuit 13-1 is illustrated in FIG. 1, a plurality of the function circuits 13-1 may be included in the embodiment. The timer 12-1 is a clocking circuit that starts counting time (clocking) according to a start trigger, ends the counting according to an end trigger, and resets. The timer 12-1 uses the activation signal as the start trigger and the completion signal as the end trigger. In the embodiment, the timer 12-1 is a general-purpose timer that does not belong to the specific function circuit 13-1. Not only one timer 12-1 but also a plurality of the timers 12-1 may be arranged. Specific examples of the function circuit 13-1 can generally include, for example, a circuit that is expected to end within a predetermined time after starting an operation, such as an analog-to-digital conversion circuit, a digital-to-analog conversion circuit, a comparator, a pulse modulation circuit, a communication circuit, or the like.

On the other hand, in order to give the timer 12-1 a function serving as a monitoring circuit, the timer 12-1 can be set with a threshold time which is an upper limit in a clocked time. For example, when a predetermined upper limit can be set for an operation time from the start of the operation to the completion of the operation of the function circuit 13-1, the function circuit 13-1 is associated with the timer 12-1, and when the clocked operation time exceeds the threshold time, a completion interruption is output from the timer 12-1. The threshold time may be set by multiplying, for example, a time required for a normal process by a predetermined allowable coefficient (for example, 1.5 or the like). The completion interruption is a signal indicating that an abnormality in the function circuit 13-1 has been detected.

The connection switching circuit 11-1 distributes the activation signal to the function circuit 13-1 and the timer 12-1, and distributes the completion signal to the timer 12-1 and an external device. Therefore, the connection switching circuit 11-1 includes branch parts 17-1 and 18-1, and selectors 14-1, 14-2, 14-3, and 14-4 (hereinafter, collectively referred to as "the selector 14"). The connection switching circuit 11-1 further includes a register 16, and the selector 14 is controlled to switch by a register setting set in the register 16 by a setting signal.

In the semiconductor device 10 according to the embodiment, for example, an activation signal for activating the function circuit 13-1 and the timer 12-1 is input from the external device, and a completion signal output by the function circuit 13-1 is output to the external device. The external device is not particularly limited, and FIG. 2 shows an example of the external device. FIG. 2 shows an example in which the semiconductor device 10 according to the embodiment is arranged as a part of a microcomputer 1. As shown in FIG. 2, the microcomputer 1 includes a CPU 2 and a function part 3, and the semiconductor device 10 is arranged as the function part 3. Moreover, in FIG. 2, other circuits included in the microcomputer 1 are not shown. In a case of the microcomputer 1 shown in FIG. 2, for example, an activation signal and a setting signal are output from the CPU 2 to the function part 3, and a completion signal and a completion interruption are output from the function part 3 to the CPU 2.

Next, the configuration and the operation of the semiconductor device 10 are described more specifically with reference to FIG. 1.

First, an activation signal is input to the connection switching circuit 11-1 from the external device (for example, a CPU). The activation signal is a signal for operating the function circuit 13-1, and may be a signal for operating the function circuit 13-1 once. In the embodiment, the activation signal is assumed to be a plurality of signals for a sequence operation of the function circuit 13-1. Thus, a plurality of the activation signals corresponding to each of a plurality of operations included in one sequence are input to the connection switching circuit 11-1. In addition, with respect to the sequence operation, a case where a single function circuit 13-1 is continuously operated and a case where a plurality of the function circuits 13-1 are sequentially operated are considered, but in the embodiment, the case where the single function circuit 13-1 is continuously operated is described as an example. A specific example of the case where the single function circuit 13-1 is continuously operated is, for example, a case where the function circuit 13-1 serving as a sensor is operated a plurality of times to acquire a plurality of measured values and an averaging process is performed. The case where the plurality of function circuits 13-1 are sequentially operated can be understood according to the following description.

The activation signal input to the connection switching circuit 11-1 is branched into two at the branch part 17-1, one is input to the selector 14-1, and the other is input to the selector 14-3. The output of the selector 14-1 is connected to the timer 12-1, and when the activation signal is selected by the register setting, the activation signal is output to the timer 12-1. The output of the selector 14-3 is connected to the function circuit 13-1, and when the activation signal is selected by the register setting, the activation signal is output to the function circuit 13-1.

On the other hand, the completion signal output from the function circuit 13-1 is branched into two at the branch part 18-1, one is input to the selector 14-2, and the other is input to the selector 14-4. The output of the selector 14-2 is connected to the timer 12-1, and when the completion signal is selected by the register setting, the completion signal is output to the timer 12-1. The output of the selector 14-4 is connected to the external device (for example, the CPU), and when the completion signal is selected by the register setting, the completion signal is output to the external device. By receiving the completion signal, the external device shifts, for example, a process included in the sequence to the next process.

Although specific illustration is omitted in FIG. 1, the activation signal, the completion signal, all outputs of the plurality of function circuits 13-1, and all outputs of the timer 12-1 (all outputs of each timer 12-1 when a plurality of the timers 12-1 are arranged) are connected to each of the selectors 14-1, 14-2, and 14-3. In addition, all completion signals are connected to the selector 14-4. In other words, the selector 14 has a function of n:1 switch, and an operation of this n:1 switch is controlled by the register setting.

Here, the output of the timer 12-1 is not limited to the completion interruption, and the output of the function circuit 13-1 is not only the completion signal, and various outputs can be assumed. For example, the output of the timer 12-1 may be a clock signal from a built-in clock source, or the like. In this case, all outputs other than the completion signal of the function circuit 13-1 and all outputs other than the completion interruption of the timer 12-1 are also input to the selectors 14-1 to 14-3. Thereby, in the semiconductor device 10, the timer 12-1 and the function circuit 13-1 can be freely connected.

The semiconductor device 10 configured as described above operates as follows. That is, if the activation signal of each process included in the sequence is sequentially input, this activation signal is branched at the branch part 17-1, one activation signal causes the function circuit 13-1 to start a predetermined operation, and the other activation signal causes the timer 12-1 to start clocking. The function circuit 13-1 outputs a completion signal when the predetermined operation is completed. The completion signal is branched into two at the branch part 18-1, one completion signal causes the timer 12-1 to stop a clocking operation and reset. In addition, the other completion signal is output to the external device (for example, the CPU) via the selector 14-4. At this time, the timer 12-1 outputs nothing if the clocked time is within the predetermined threshold time, and on the other hand, when the clocked time exceeds the threshold time, the timer 12-1 outputs a completion interruption to the external device. Because this completion interruption indicates an abnormal state, the external device (a host device) that has received this completion interruption executes, for example, a predetermined abnormality process.

The above operations are sequentially executed for each process included in the sequence, and the timer 12-1, which has been reset by the function circuit 13-1 completing operations normally, is restarted according to an activation signal of a next process. Thereby, in the semiconductor device 10, the function circuit 13-1 and the timer 12-1 are activated according to one activation signal input from the external device, the timer 12-1 stops clocking by one completion signal output from the function circuit 13-1, and the external device can shift the process included in the sequence to a next process. At this time, when the function circuit 13-1 can complete the process within the predetermined threshold time, the external device can shift the sequence to the next process or complete the sequence. On the other hand, when the function circuit 13-1 cannot complete the process within the predetermined threshold time, an interruption signal (a completion interruption) of the timer is generated due to the expiration of the timer 12-1, and thus an abnormality can be notified.

Figure 3:
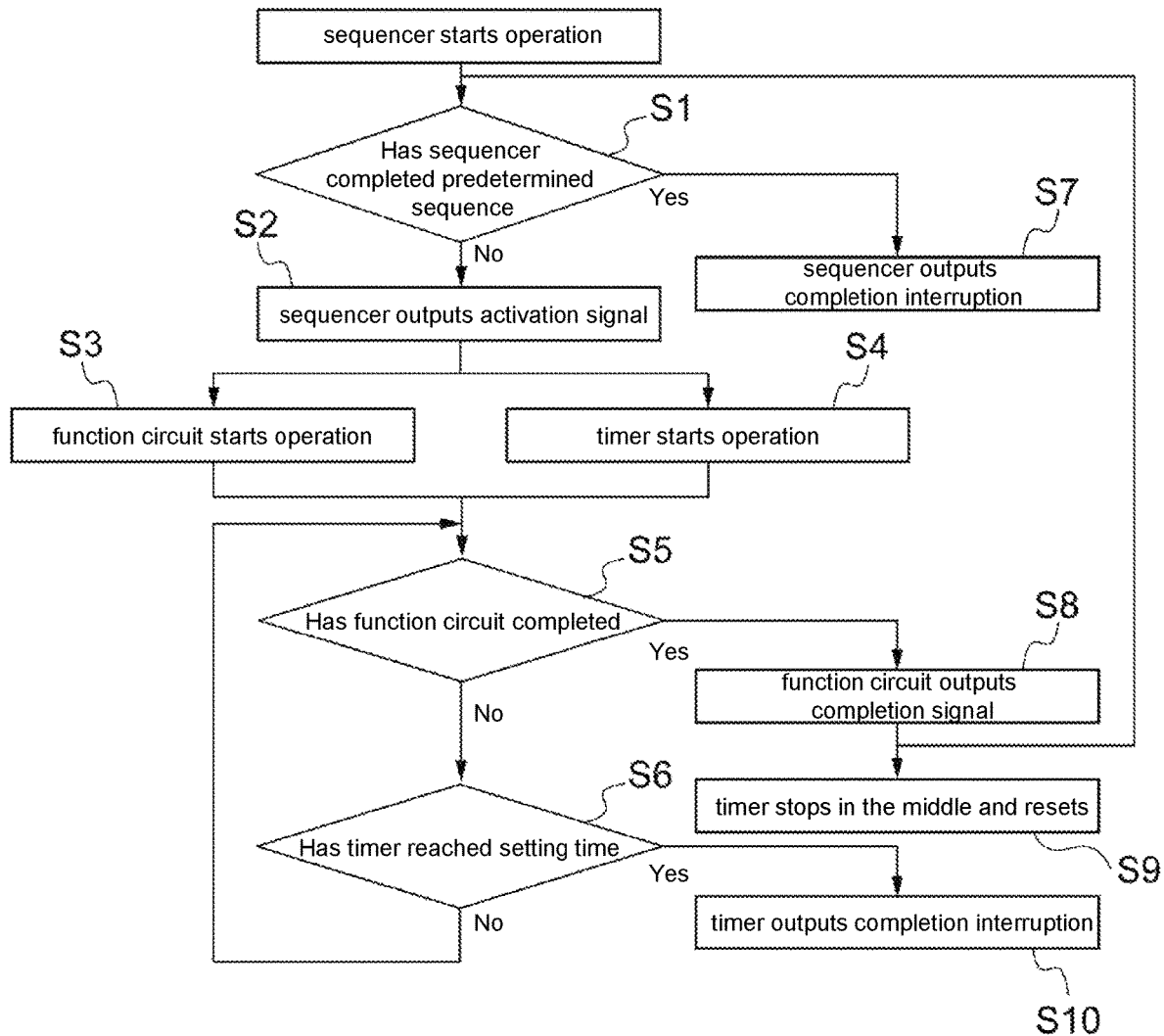
FIG. 3 is a flowchart showing an operation of the semiconductor device according to the first embodiment.

The operation of the semiconductor device 10 according to the embodiment is described more specifically with reference to FIG. 3. FIG. 3 is a flowchart showing a flow of a procedure when the semiconductor device 10 performs the sequence process, and a "sequencer" shown in FIG. 3 corresponds to the above external device.

In step S1, whether or not the sequencer has completed an entire predetermined sequence is determined, and if the determination is negative, the process proceeds to step S2. On the other hand, if the determination is positive, the process proceeds to step S7, and the sequencer outputs the completion interruption. The completion interruption is a signal indicating that all processes included in the sequence have been completed.

In step S2, the sequencer outputs the activation signal. The output activation signal is branched by the branch part 17-1 and sent to the function circuit 13-1 and the timer 12-1.

In step S3, the function circuit 13-1 starts an operation, and in step S4, the timer 12-1 starts an operation. Step S3 and step S4 are not sequential operations, but are operations independent from each other.

In step S5, a subsequent process branches to step S6 and step S8 depending on whether or not the function circuit 13-1 normally completes the predetermined process. Moreover, the determination is not performed in this step, and the branching is performed independently by a circuit operation.

If the function circuit 13-1 does not normally complete the predetermined process, the timer 12-1 continues the clocking in step S6 until the clocked time reaches the threshold time. When the clocked time reaches the threshold time, the process proceeds to step S10, and the timer 12-1 outputs a completion interruption.

In step S8, upon receiving that the function circuit 13-1 has normally completed the process, the function circuit 13-1 sends a completion signal to the sequencer and the timer 12-1.

When the sequencer receives the completion signal, the process proceeds to step S1, and the next process is started. On the other hand, in step S9, the timer 12-1 that has received the completion signal completes (stops) the clocking in the middle and resets. That is, the timer 12-1 comes into a standby state for a next activation signal.

As described above, in the semiconductor device 10 according to the embodiment, a general-purpose timer 12-1, which can also be applied for other purposes such as a function circuit and the like, is used as a monitoring circuit of the function circuit 13-1, and a monitoring circuit dedicated to the function circuit 13-1 is not arranged. In addition, when the plurality of function circuits 13 are arranged, the timer 12-1 is connected to each of the plurality of function circuits 13, and thereby one timer 12-1 can also be shared by the plurality of function circuits 13. That is, the monitoring circuits can be reduced, and as a result, the cost is also reduced.

In addition, in the semiconductor device 10 according to the embodiment, the connection switching circuit 11-1 includes the branch parts 17-1 and 18-1, and thereby one input signal (activation signal or completion signal) is assigned to each of a plurality of connection destinations. The connections can be freely rearranged by the branch parts 17-1 and 18-1 and the selector 14 even when a plurality of circuits such as the function circuit 13, the timer 12, and the like are arranged. Thereby, even if the connections of the function circuit 13 and the timer 12 included in the semiconductor device 10 change depending on an application, a semiconductor device 10 corresponding to the different application can be configured in a manner of rearranging a connection of each selector by the register setting.

As specifically described above, according to the semiconductor device of the embodiment, an effect is produced of being able to provide a semiconductor device having a monitoring function with a higher degree of freedom.

Second Embodiment

A semiconductor device 10A according to the embodiment is described with reference to FIG. 4. The semiconductor device 10A is a form in which a sequence circuit 15-1 is added to the semiconductor device 10 according to the above embodiment. Thus, because a part including the connection switching circuit 11-1, the function circuit 13-1, and the timer 12-1 is the same as that of the semiconductor device 10, specific descriptions thereof are omitted with reference to FIG. 1 as necessary. Moreover, in FIG. 4, the register 16 shown in FIG. 1 is not shown.

Figure 2:
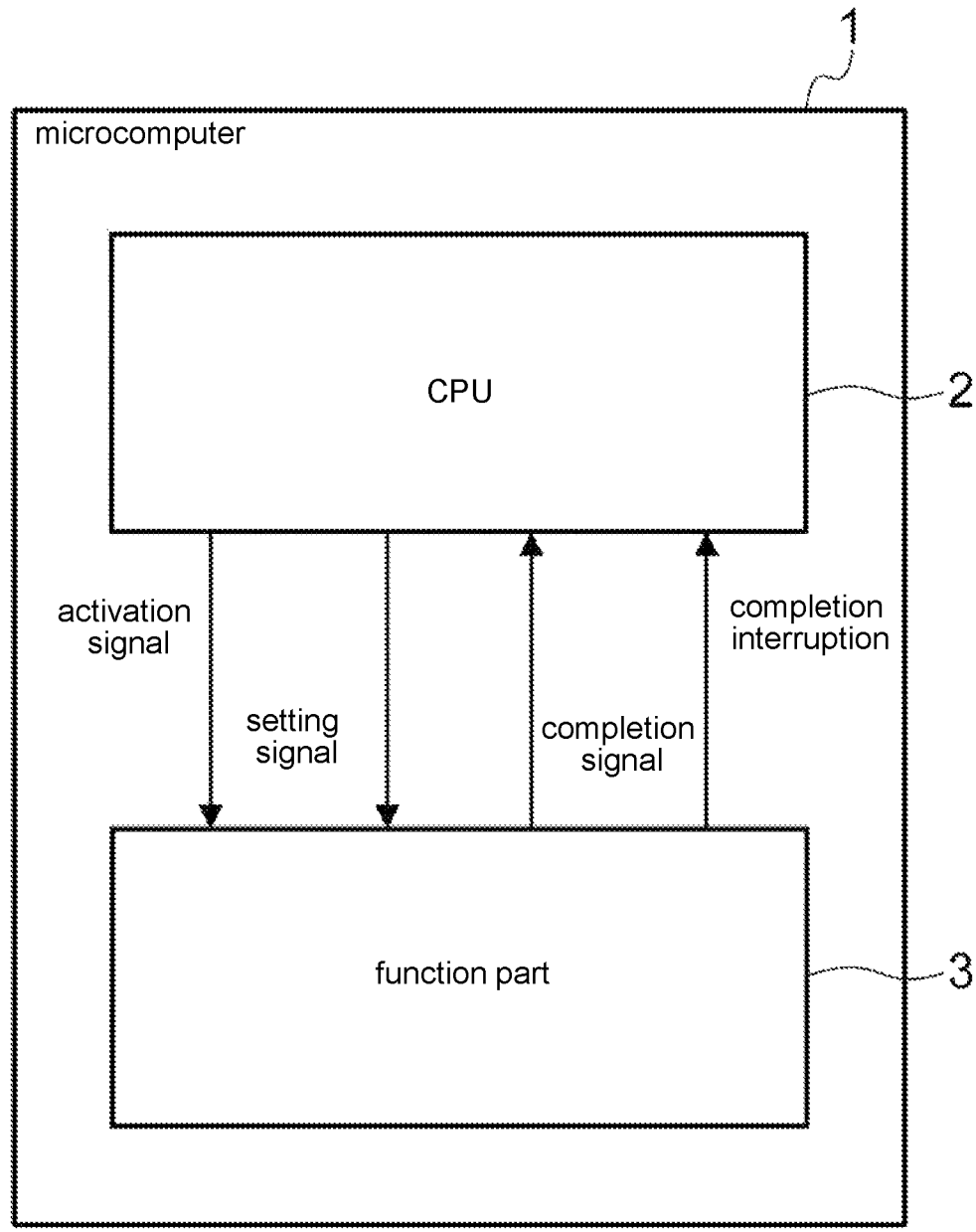
FIG. 2 is a block diagram showing another form of the semiconductor device according to the embodiment.
Figure 4:
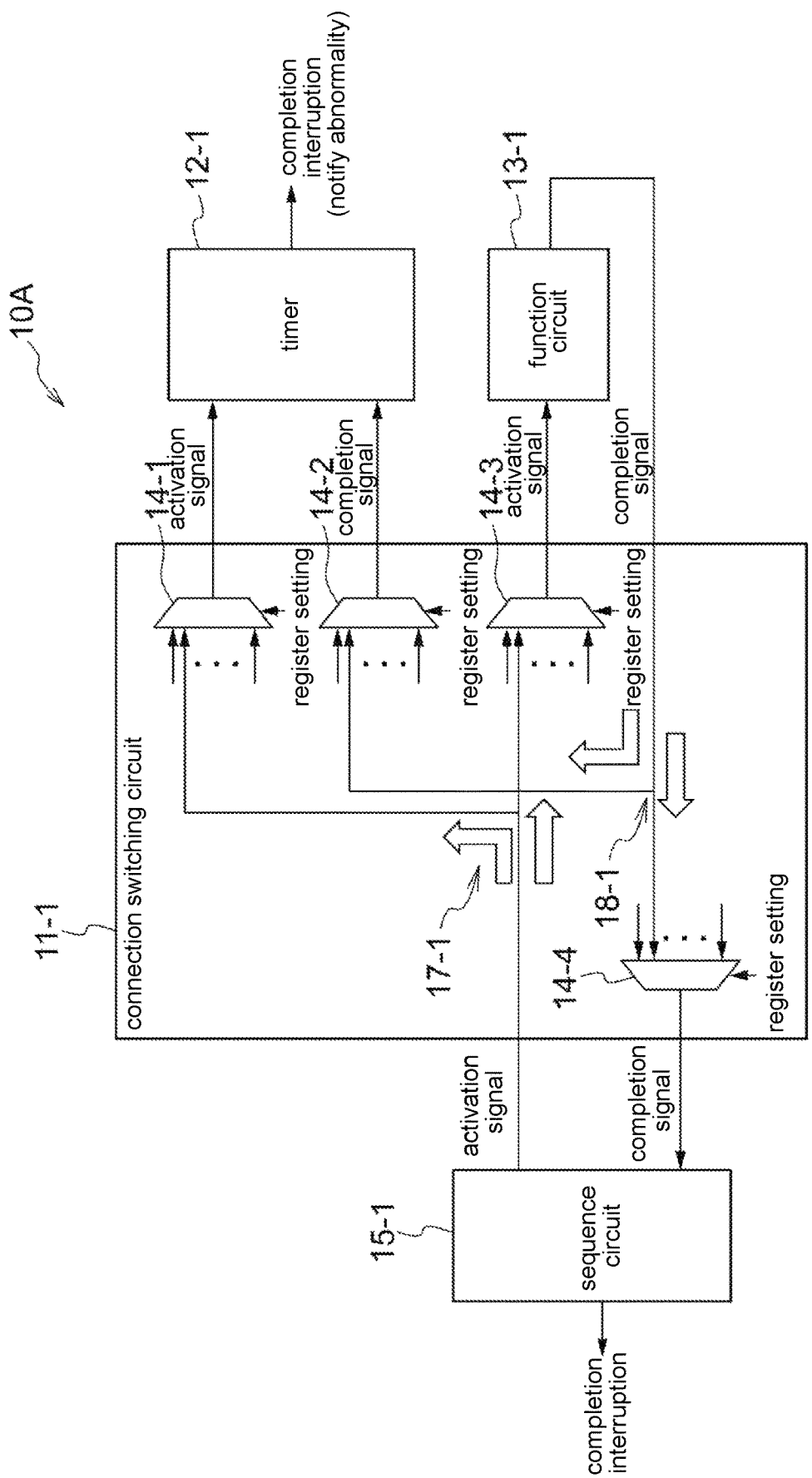
FIG. 4 is a block diagram showing an example of a configuration of a semiconductor device according to a second embodiment.

The sequence circuit 15-1 shown in FIG. 4 is a circuit that controls the sequence including a plurality of processes in the function circuit 13-1, and the sequence circuit 15-1 has the same function as the CPU 2 shown in FIG. 2. That is, the sequence circuit 15-1 sends an activation signal for controlling each process in the function circuit 13-1 to the connection switching circuit 11-1, and receives a completion signal of each process in the function circuit 13-1 from the connection switching circuit 11-1. The sequence circuit 15-1 shifts the process to the next process each time the sequence circuit 15-1 receives a completion signal of each process executed sequentially. Then, when the sequence circuit 15-1 receives a completion signal of the final process, the sequence circuit 15-1 outputs a completion interruption to the external device. In addition, the completion interruption from the timer 12-1 is also output to the external device.

In the embodiment, the form of the external device is not particularly limited, and for example, the CPU 2 in FIG. 2 can be used. In this case, the semiconductor device 10A is arranged as the function part 3 shown in FIG. 2. Moreover, although not shown in FIG. 4, the semiconductor device 10A may be configured in a manner that the sequence circuit 15-1 receives, from the external device (for example, the CPU), an initial activation signal for starting a sequence operation. The semiconductor device 10A according to the embodiment can also produce the same effect as the semiconductor device 10 according to the above embodiment.

Third Embodiment

A semiconductor device 10B according to the embodiment is described with reference to FIG. 5. The semiconductor device 10B is in a form in which a plurality of timers 12 are arranged according to applications.

Figure 5:
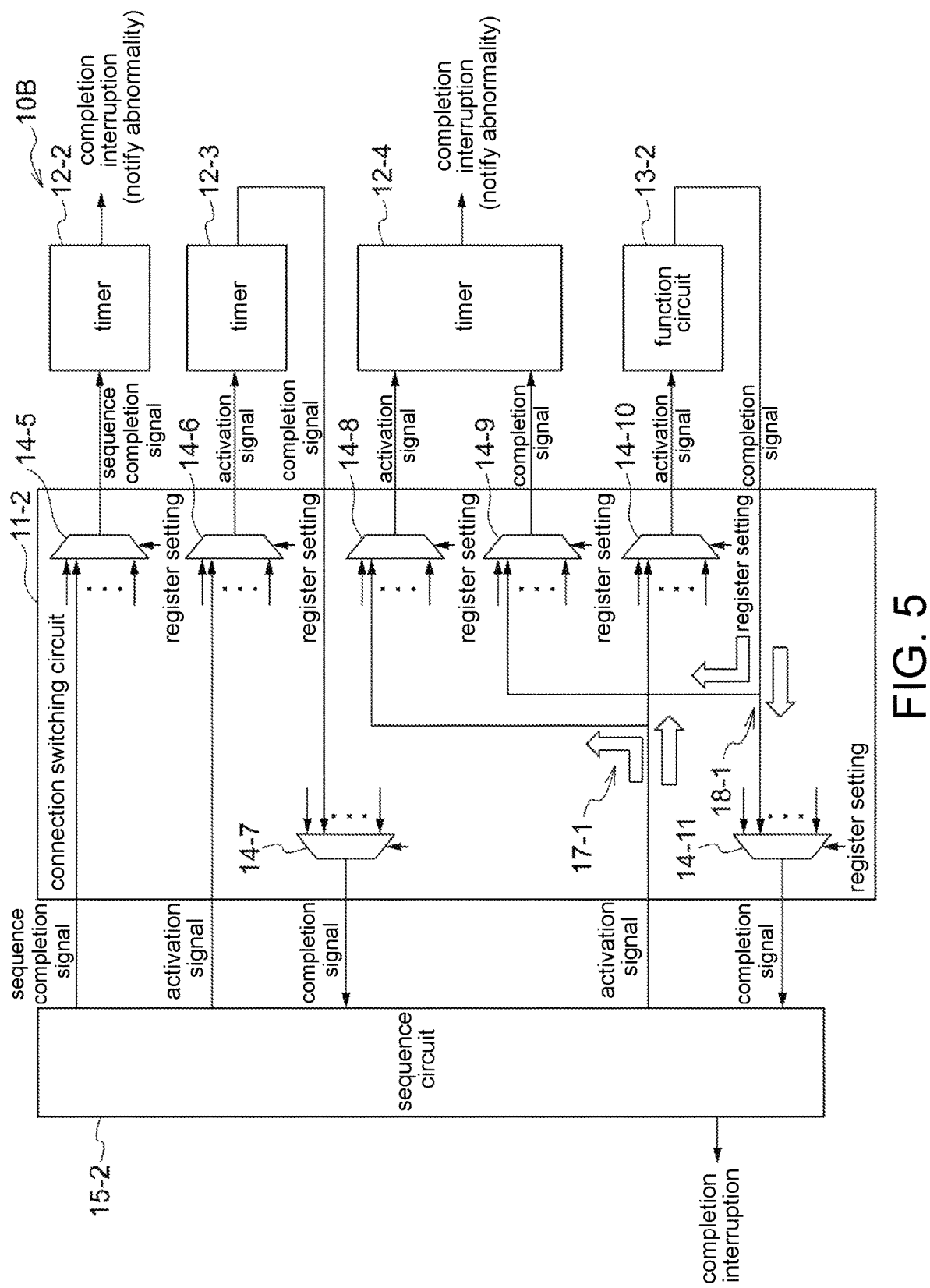
FIG. 5 is a block diagram showing an example of a configuration of a semiconductor device according to a third embodiment.

As shown in FIG. 5, the semiconductor device 10B includes a sequence circuit 15-2, a connection switching circuit 11-2, a function circuit 13-2, and timers 12-2, 12-3, and 12-4. The connection of a part including selectors 14-8, 14-9, 14-10, and 14-11 which are included in the connection switching circuit 11-2, the function circuit 13-2, and the timer 12-4 is the same as that of the semiconductor device 10 shown in FIG. 1. Thus, operations of the part are the same as that of the semiconductor device 10. In the embodiment, the function circuit 13-2 also executes a plurality of processes corresponding to each process included in the sequence. The semiconductor device 10B may be configured as a single unit, or may be configured as the function part 3 in the microcomputer 1 shown in FIG. 2. Moreover, in FIG. 5, the register 16 shown in FIG. 1 is not shown.

The sequence circuit 15-2 controls procedures of a plurality of processes that are included in the sequence and executed by the function circuit 13-2, and the following functions are added to the sequence circuit 15-2 with respect to the sequence circuit 15-1. That is, an activation signal is sent to the timer 12-3 via the connection switching circuit 11-2, a sequence completion signal indicating the completion of the sequence is sent to the timer 12-2 via the connection switching circuit 11-2, and a completion signal from the timer 12-3 is received via the connection switching circuit 11-2.

In addition to the selectors 14-8 to 14-11, the connection switching circuit 11-2 includes selectors 14-5, 14-6, and 14-7. The selector 14-5 receives the sequence completion signal from the sequence circuit 15-2 and sends the sequence completion signal to the timer 12-2. The selector 14-6 receives the activation signal from the sequence circuit 15-2 and sends the activation signal to the timer 12-3. The selector 14-7 receives the completion signal from the timer 12-3 and sends the completion signal to the sequence circuit 15-2.

Here, the function of each timer included in the semiconductor device 10B is described. Similar to the timer 12-1 shown in FIG. 1, the timer 12-4 is a timer for monitoring each process in the function circuit 13-2. That is, a threshold time of a process time of each process is set, the process is started according to an activation signal, and when the clocked time exceeds the threshold time, a completion interruption for notifying an abnormality is output.

The timer 12-3 has a function of setting a waiting time before a process is started for each process included in the sequence. That is, an activation signal for starting the waiting time of each process is input to the timer 12-3 from the sequence circuit 15-2, and a completion signal indicating that the clocking of the waiting time has ended is output from the timer 12-3. The waiting time is set in the timer 12-3 in advance, and the waiting time may be the same time or different times in each process.

Furthermore, the timer 12-2 is a timer for monitoring the entire sequence. Thus, a threshold time corresponding to a process time of the entire sequence is set in the timer 12-2. The timer 12-2 does not output anything if the clocked time ended due to receiving a sequence completion signal indicating the completion of the entire sequence is within the threshold time, and the timer 12-2 outputs a completion interruption to the external device when the clocked time exceeds the threshold time.

Next, the sequence process executed by the sequence circuit 15-2 is described according to Procedures T. In the sequence according to the embodiment, n processes of Process 1, Process 2, . . . and Process n are executed in this order.

First, a sequence process when each process in the function circuit 13-2 is completed normally is as follows.

<T1>: A sequence activation signal for starting the sequence is transmitted to the timer 12-2. The sequence activation signal is transmitted from the sequence circuit 15-2 or the external device (not shown).

<T2>: The sequence circuit 15-2 transmits an activation signal for activating a waiting time of Process 1 to the timer 12-3 at the same time as the sequence activation signal or after a predetermined delay time.

<T3>: The timer 12-3 outputs a completion signal after the elapse of a predetermined clocked time, and resets the clocking.

<T4>: The sequence circuit 15-2 that has received the completion signal from the timer 12-3 transmits an activation signal of Process 1 to the function circuit 13-2 and the timer 12-4.

<T5>: The function circuit 13-2 that has received the activation signal of Process 1 starts Process 1, and the timer 12-4 starts the clocking.

<T6>: The function circuit 13-2 that has normally completed Process 1 outputs a completion signal.

<T7>: The timer 12-4 that has received the completion signal from the function circuit 13-2 resets the clocking. In addition, the sequence circuit 15-2 that has received the completion signal from the function circuit 13-2 transmits an activation signal to the timer 12-3.

Procedure T7 corresponds to Procedure T2, and hereinafter, Procedures T2 to T7 are repeated. Hereinafter, Procedures TN are described from an activation of Process n.

<TN1>: The sequence circuit 15-2 transmits an activation signal for activating a waiting time of Process n to the timer 12-3.

<TN2>: The timer 12-3 outputs a completion signal after the elapse of a predetermined clocked time.

<TN3>: The sequence circuit 15-2 that has received the completion signal from the timer 12-3 transmits an activation signal of Process n to the function circuit 13-2 and the timer 12-4.

<TN4>: The function circuit 13-2 that has received the activation signal of Process n starts Process n, and the timer 12-4 starts the clocking.

<TN5>: The function circuit 13-2 that has normally completed Process n outputs a completion signal.

<TN6>: The sequence circuit 15-2 that has received the completion signal from the function circuit 13-2 transmits a sequence completion signal to the timer 12-2.

<TN7>: The timer 12-2 that has received the sequence completion signal stops the clocking and resets the clocking.

On the other hand, Procedures T' after Procedure T5 when an abnormality occurs in the function circuit 13-2 in Process 1 are as follows. Moreover, in the following procedures, processes other than Process 1 are the same.

<T'5>: The function circuit 13-2 in which an abnormality occurs does not operate even if the function circuit 13-2 receives an activation signal of Processing 1.

<T'6>: Because the function circuit 13-2 does not output the completion signal of Procedure 1, the clocked time of the timer 12-4 reaches the threshold time, and the timer 12-4 outputs a completion interruption.

<T'7>: The external device (for example, the CPU) that has received the completion interruption in Procedure T'6 executes a predetermined abnormality process such as the stop of each function circuit 13-2, and the like. Moreover, the completion interruption may be transmitted to the sequence circuit 15-2, and the sequence circuit 15-2 may execute the abnormality process.

In addition, Procedures TN' after Procedure TN6 when the sequence completion signal is not transmitted to the timer 12-2 for some reason such as an abnormality of the sequence circuit 15-2 and the like are as follows.

<TN'6>: The sequence circuit 15-2 in which an abnormality occurs does not transmit a sequence completion signal to the timer 12-2 even if the sequence circuit 15-2 receives a completion signal from the function circuit 13-2.

<TN'7>: Due to not receiving the sequence completion signal, the clocked time in the timer 12-2 reaches the threshold time. Therefore, the timer 12-2 outputs a completion interruption.

<TN'8>: The external device (for example, the CPU) that has received the completion interruption in Procedure TN'7 executes a predetermined abnormality process such as the stop of each function circuit 13-2, and the like. Moreover, the completion interruption may be transmitted to the sequence circuit 15-2, and the sequence circuit 15-2 may execute the abnormality process.

As described in detail above, in the semiconductor device 10B according to the embodiment, in addition to the effects of the semiconductor device 10 according to the above embodiment, different functions can be assigned to each timer by changing the connection of the timers 12-2, 12-3 and 12-4 which are general-purpose timers respectively. In addition, the connection can be changed by changing the register setting of the selector 14. Moreover, in the embodiment, the form in which the different functions are assigned to the timer 12 has been described as an example, but similarly, a form in which different functions are assigned to the function circuit 13 can also be used. In addition, in the semiconductor device 10B according to the embodiment, because the monitoring function can be operated by hardware, software can be reduced, and thus effort for developing the software can be reduced and consumption can also be reduced by reducing an operation time of the CPU.

Fourth Embodiment

Figure 6:
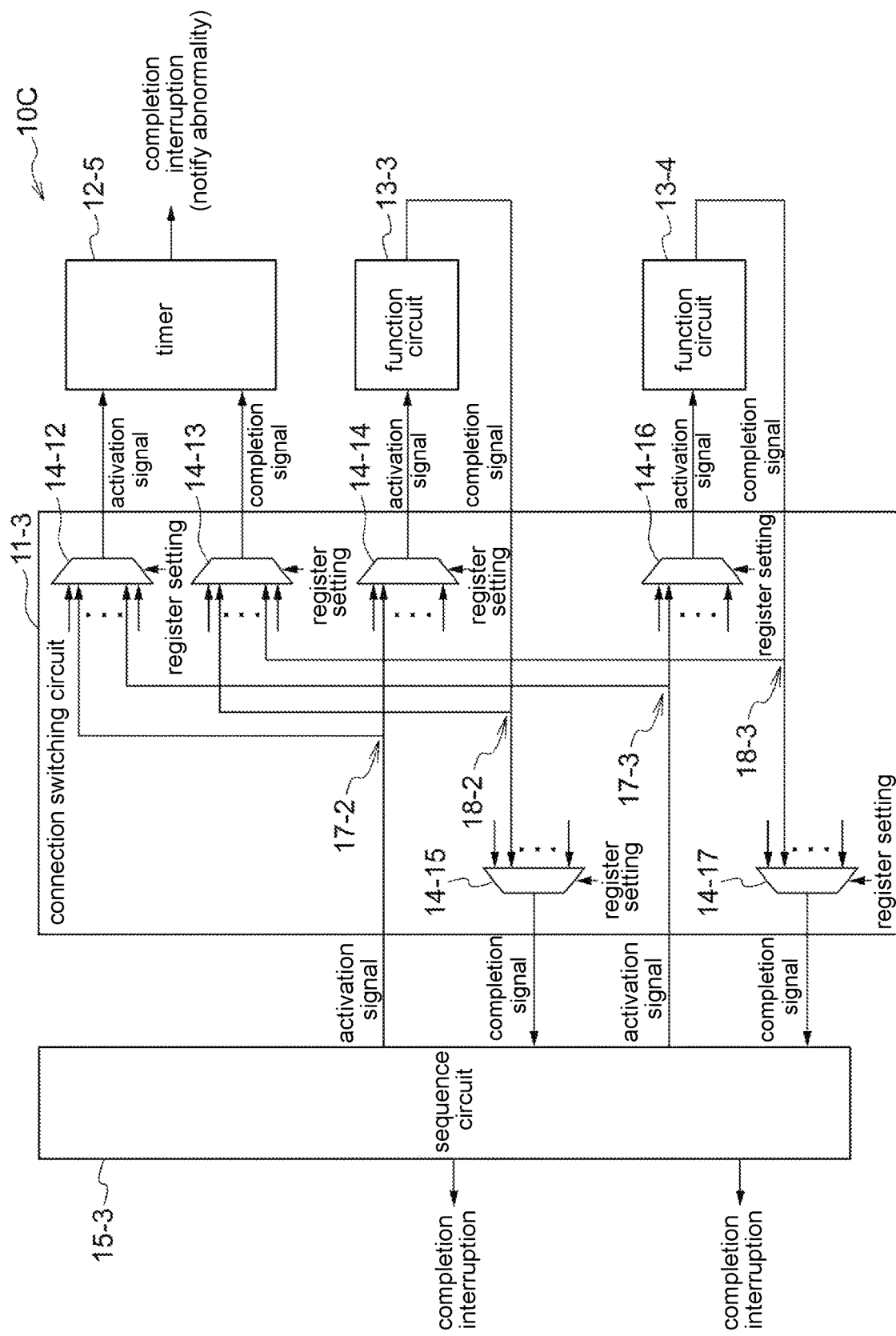
FIG. 6 is a block diagram showing an example of a configuration of a semiconductor device according to a fourth embodiment.
Figure 7:
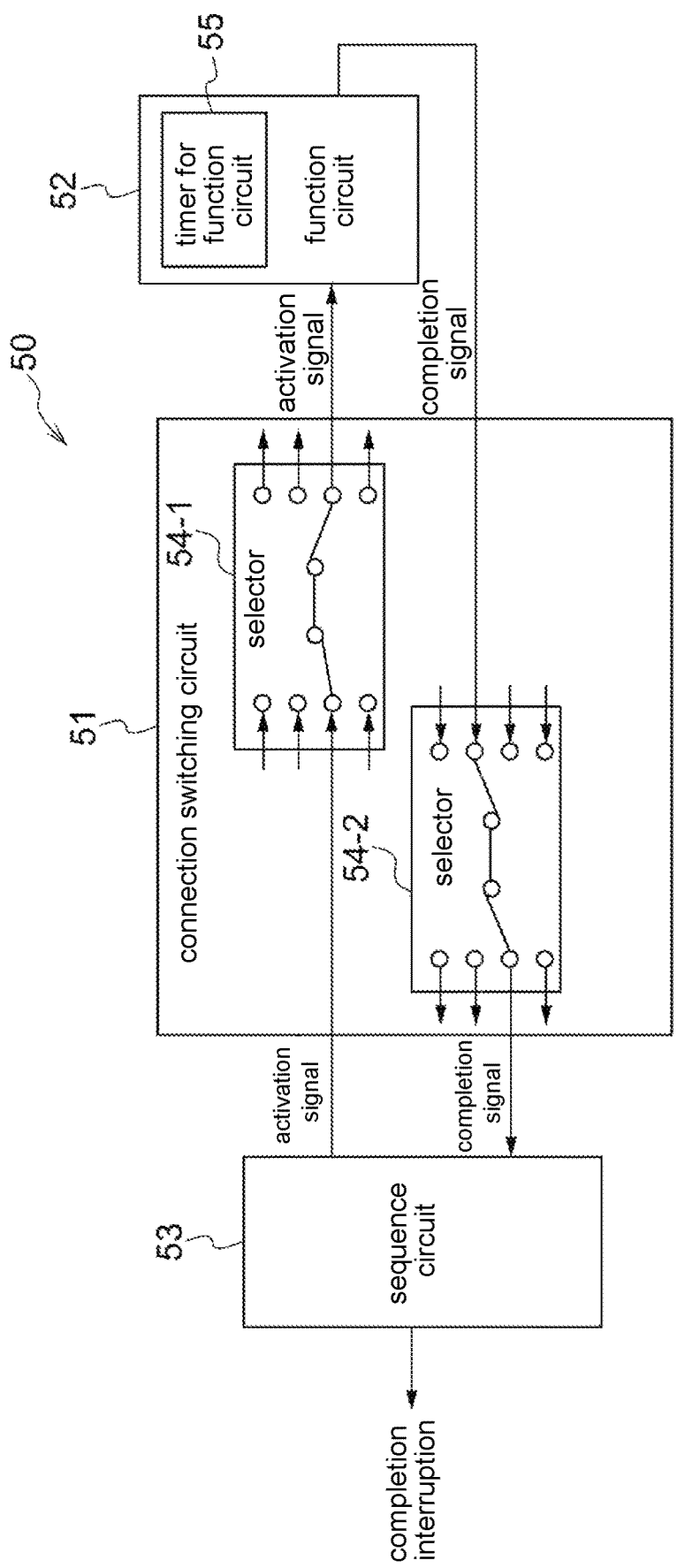
FIG. 7 is a block diagram showing a configuration of a semiconductor device according to a comparative example.

A semiconductor device 10C according to the embodiment is described with reference to FIG. 6. The semiconductor device 10C is different from the semiconductor device according to each of the above embodiments in that the semiconductor device 10C includes a plurality of function circuits 13. Thus, the same reference numerals are given to configurations having the same functions, and specific descriptions thereof are omitted. As shown in FIG. 6, the semiconductor device 10C includes a sequence circuit 15-3, a connection switching circuit 11-3, function circuits 13-3 and 13-4, and a timer 12-5. FIG. 6 illustrates a case where two function circuits 13-3 and 13-4 share one timer 12-5 as a monitoring circuit. Moreover, in FIG. 6, the register 16 shown in FIG. 1 is not shown.

As shown in FIG. 6, the sequence circuit 15-3 according to the embodiment sends an activation signal for activating each of the function circuits 13-3 and 13-4 to the function circuits 13-3 and 13-4 and the timer 12-5 via the connection switching circuit 11-3 according to the process included in the sequence, and the sequence circuit 15-3 receives a completion signal from each of the function circuits 13-3 and 13-4 via the connection switching circuit 11-3. In addition, the sequence circuit 15-3 sends the completion signal received from each of the function circuits 13-3 and 13-4 to the external device.

The connection switching circuit 11-3 according to the embodiment includes branch parts 17-2, 17-3, 18-2, and 18-3, and selectors 14-12, 14-13, 14-14, 14-15, 14-16, and 14-17. The branch part 17-2 distributes an activation signal of the function circuit 13-3 to the timer 12-5 and the function circuit 13-3, and the branch part 18-2 distributes a completion signal from the function circuit 13-3 to the timer 12-5 and the selector 14-15. The completion signal input to the selector 14-15 is sent to the sequence circuit 15-3. In addition, the branch part 17-3 distributes an activation signal of the function circuit 13-4 to the timer 12-5 and the function circuit 13-4, and the branch part 18-3 distributes a completion signal from the function circuit 13-4 to the timer 12-5 and the selector 14-17. The completion signal input to the selector 14-17 is sent to the sequence circuit 15-3.

According to the above configuration, the activation signal of each of the function circuits 13-3 and 13-4 is sent to the function circuits 13-3 and 13-4 and also sent to the timer 12-5, the completion signal from each of the function circuits 13-3 and 13-4 is sent to the sequence circuit 15-3 and also sent to the timer 12-5. This is the same even if the number of the function circuits 13 is three or more. That is, by arranging pairs of branch parts 17 and 18 (branch part pairs) having the same number as the function circuits, one timer 12 can be shared by the plurality of function circuits 13 to reduce the number of the monitoring circuits.

Moreover, the semiconductor device 10C differs from the semiconductor device according to each of the above embodiments only in that the activation signal of each processing included in the sequence is individually sent to the function circuit 13 in the semiconductor device according to each of the above embodiments. Thus, the operation of the semiconductor device 10C is the same as that of the semiconductor device according to each of the above embodiments.

As described above, according to the semiconductor device of the embodiment, the effect is also produced of being able to provide a semiconductor device having a monitoring function with a higher degree of freedom.

What is claimed is:

1. Semiconductor device, comprising:
   a function part that executes a predetermined process triggered according to an activation signal sent from an external device and outputs a completion signal after the predetermined process is completed;
   a first clocking part, that is independent from the function part, that monitors a first abnormality in the predetermined process based on the activation signal and the completion signal; and
   a branch part pair comprising a first branch part and a second branch part, wherein the first branch part branches the activation signal and then sends the branched activation signal to different inputs of the function part and the first clocking part, and the second branch part branches the completion signal and then sends the branched completion signal to the first clocking part and the external device.

2. The semiconductor device according to claim 1, further comprising:
   a first selector arranged on a rear stage of the first branch part and distributing the activation signal to the function part;
   a second selector arranged on the rear stage of the first branch part and distributing the activation signal to the first clocking part;
   a third selector arranged on a rear stage of the second branch part and distributing the completion signal to the clocking part; and
   a fourth selector arranged on the rear stage of the second branch part and distributing the completion signal to the external device.

3. The semiconductor device according to claim 1, wherein the function part executes a plurality of the predetermined processes; and
   the external device controls execution procedures of the plurality of predetermined processes.

4. The semiconductor device according to claim 2, wherein the function part executes a plurality of the predetermined processes; and
   the external device controls execution procedures of the plurality of predetermined processes.

5. The semiconductor device according to claim 1, comprising a plurality of the function parts and
   a plurality of the branch part pairs corresponding to each of the plurality of function parts; wherein
   the activation signal is sent to each of the plurality of function parts and the first clocking part, and the completion signal from each of the plurality of function parts is sent to the first clocking part and the external device.

6. The semiconductor device according to claim 2, comprising a plurality of the function parts and
   a plurality of the branch part pairs corresponding to each of the plurality of function parts; wherein
   the activation signal is sent to each of the plurality of function parts and the first clocking part, and the completion signal from each of the plurality of function parts is sent to the first clocking part and the external device.

7. The semiconductor device according to claim 5, wherein
   the external device controls the execution procedures of the plurality of predetermined process executed by the plurality of function parts.

8. The semiconductor device according to claim 6, wherein
   the external device controls the execution procedures of the plurality of predetermined process executed by the plurality of function parts.

9. The semiconductor device according to claim 1, comprising
   at least one second clocking part that monitors the predetermined process based on the activation signal, wherein
   the second clocking part monitors a second abnormality different from the first abnormality in the predetermined process.

10. The semiconductor device according to claim 2, comprising
    at least one second clocking part that monitors the predetermined process based on the activation signal, wherein
    the second clocking part monitors a second abnormality different from the first abnormality in the predetermined process.

11. The semiconductor device according to claim 3, comprising
    at least one second clocking part that monitors the predetermined process based on the activation signal, wherein
    the second clocking part monitors a second abnormality different from the first abnormality in the predetermined process.

12. The semiconductor device according to claim 5, comprising
    at least one second clocking part that monitors the predetermined process based on the activation signal, wherein
    the second clocking part monitors a second abnormality different from the first abnormality in the predetermined process.

13. The semiconductor device according to claim 7, comprising
    at least one second clocking part that monitors the predetermined process based on the activation signal, wherein the second clocking part monitors a second abnormality different from the first abnormality in the predetermined process.

14. The semiconductor device according to claim 1, wherein
a predetermined threshold time of a clocked time is set in the first clocking part; and
the first clocking part detects the first abnormality when the clocked time exceeds the threshold time according to that the completion signal is not received after the clocking is started according to the activation signal.

15. The semiconductor device according to claim 2, wherein
a predetermined threshold time of a clocked time is set in the first clocking part; and
the first clocking part detects the first abnormality when the clocked time exceeds the threshold time according to that the completion signal is not received after the clocking is started according to the activation signal.

16. The semiconductor device according to claim 3, wherein
a predetermined threshold time of a clocked time is set in the first clocking part; and
the first clocking part detects the first abnormality when the clocked time exceeds the threshold time according to that the completion signal is not received after the clocking is started according to the activation signal.

17. The semiconductor device according to claim 5, wherein
a predetermined threshold time of a clocked time is set in the first clocking part; and
the first clocking part detects the first abnormality when the clocked time exceeds the threshold time according to that the completion signal is not received after the clocking is started according to the activation signal.

18. The semiconductor device according to claim 7, wherein
a predetermined threshold time of a clocked time is set in the first clocking part; and
the first clocking part detects the first abnormality when the clocked time exceeds the threshold time according to that the completion signal is not received after the clocking is started according to the activation signal.

19. The semiconductor device according to claim 9, wherein
a predetermined threshold time of a clocked time is set in the first clocking part; and
the first clocking part detects the first abnormality when the clocked time exceeds the threshold time according to that the completion signal is not received after the clocking is started according to the activation signal.

* * * * *